US005301027A

United States Patent [19]
Kiyofuji et al.

[11] Patent Number: 5,301,027
[45] Date of Patent: Apr. 5, 1994

[54] METHOD OF SUPERIMPOSING DATA OF CHARACTER ON VIDEO DATA

[75] Inventors: Takashi Kiyofuji, Yokosuka; Hiroshi Yamada, Tokyo; Kohsuke Kinoshita; Toshihiko Monma, both of Yokohama, all of Japan

[73] Assignee: Victor Company of Japan, Ltd., Yokohama, Japan

[21] Appl. No.: 35,776

[22] Filed: Mar. 23, 1993

[30] Foreign Application Priority Data

Mar. 24, 1992 [JP] Japan .................................. 4-97000

[51] Int. Cl.⁵ .......................................... H04N 5/278
[52] U.S. Cl. ...................................... 348/589; 382/56; 345/124; 348/722
[58] Field of Search ............... 358/183, 22 P, 22, 180, 358/147, 185, 451, 452; 340/721, 731; 382/56, 47; H04N 5/278

[56] References Cited

U.S. PATENT DOCUMENTS

| | | | |
|---|---|---|---|
| 4,090,188 | 5/1978 | Suga | 340/731 |
| 4,409,591 | 10/1983 | Simkovitz | 340/731 |
| 4,555,191 | 11/1985 | Gojo | 382/56 |
| 4,914,709 | 4/1990 | Rudak | 358/22 |

OTHER PUBLICATIONS

IEEE Transactions on Consumer Electronics vol. 35, No. 4, Nov. 1989, New York, US, pp. 803-809, G. Lunn et al. "A Multisystems on Screen Display for TV MCU".

*Primary Examiner*—James J. Groody
*Assistant Examiner*—Sherrie Hsia
*Attorney, Agent, or Firm*—Lowe, Price, LeBlanc & Becker

[57] ABSTRACT

In a method of superimposing data of a character (mark) on video data, the superimposed video data being subjected to a data compression processing for extracting video data within each of blocks from one frame of the superimposed video data and for data-compressing the extracted video data, the blocks forming one frame, the each block including a predetermined number of two-dimensionally arranged pixels of the superimposed video data, a position of the character superimposed on the video data with respect to a lump of the blocks, where the character is to be imposed, is determined such that the number of blocks over which the character spreads is minimized when a size and a shape of the character or the mark are unchanged. In the method, at least a portion of a body of the character at a middle portion of the block and an outline of the character near a boundary of the block are arranged, or a horizontal (vertical) size of the character in accordance with a natural number times the number of horizontally (vertically) arranged pixels out of the two-dimensionally arranged pixels within the block. Thus, noise occurring around the character at blocks where the character exists is made inconspicuous.

15 Claims, 5 Drawing Sheets

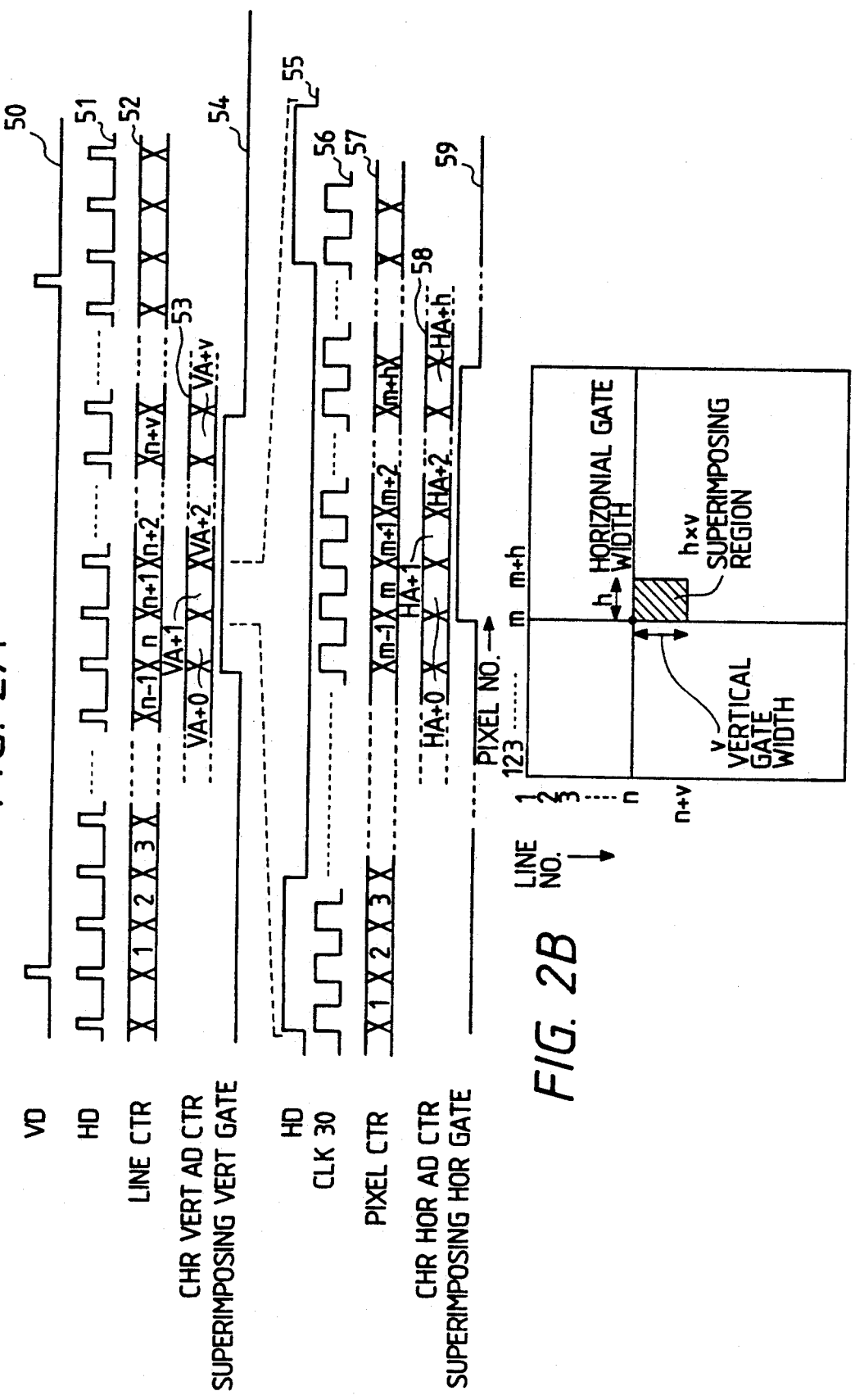

92. 3. 5
AM 10:00

92. 3. 5   AM 10:00

64 BODY OF CHARACTER
62 CHARACTER BOUNDARY
63 SMALLEST COMMON RECT
61 CHARACTER OUTLINE
66 PIXEL
67 BLOCK

70 PERIOD

FIG. 6 PRIOR ART
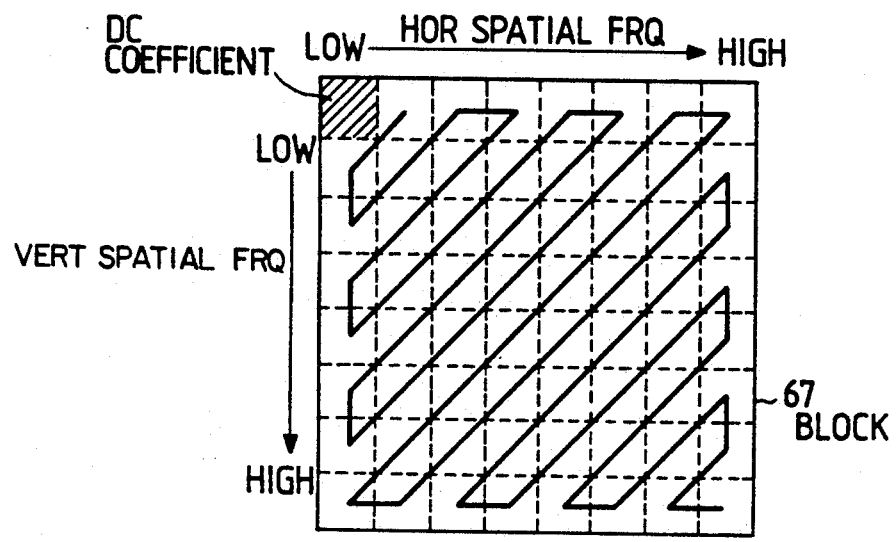
FIG. 7A PRIOR ART
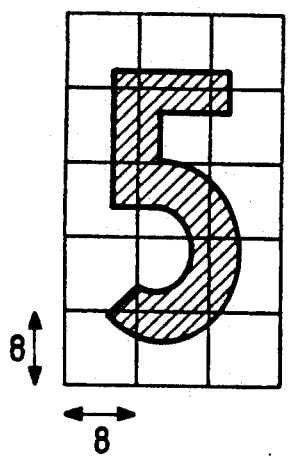
FIG. 7B PRIOR ART
FIG. 7C PRIOR ART
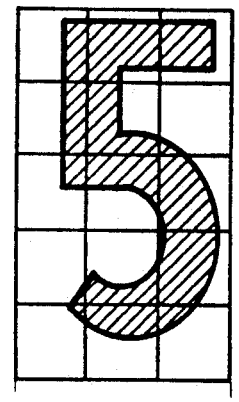

METHOD OF SUPERIMPOSING DATA OF CHARACTER ON VIDEO DATA

BACKGROUND OF THE INVENTION

1. Field of the Invention

This invention relates to a method of superimposing data of a character or a mark, such as @, and →, on video data, the video data including the superimposed data being subjected to a data compression processing in which the video data including the superimposed data within a block of pixels are extracted from one frame of the video data including the superimposed data and a data compression is effected at every block of pixels.

2. Description of the Prior Art

A prior art method of superimposing data of a character or a mark on video data in a digital VTR (video tape recorder) is known. In such a digital VTR, the band compression (data compression) of video data is carried out to reduce an amount of tape consumption. Therefore, an image of the superimposed character of a mark is affected by the band compression because a character or mark has steep edges.

FIG. 5 is a block diagram of an example of a video data compression unit 23 for effecting a video data compression processing. FIG. 6 is an illustration of a DCT coefficient block for showing the zigzag scanning operation carried out in the prior art video data compression unit shown in FIG. 5. FIGS. 5 and 6 are used in the embodiment of this invention also.

An extraction circuit 10 consecutively extracts data of a DCT (Discrete cosine Transform) block including 8×8 pixels from one frame of video data. The extracted data is supplied to a DCT circuit 1 (8×8 DCT). The DCT circuit 1 supplies 8×8 conversion coefficients obtained by the two-dimensional discrete cosine transforming to a linear quantizer 2. The linear quantizer 2 effects the linear quantizing with a quantizing matrix obtained by multiplying a reference quantizing matrix supplied from a quantizing matrix generator 3 (quantizing matrix) by a scaling factor S with a multiplier 4 to provide a dc conversion coefficient 2a and ac conversion coefficients 2b which are supplied to a one-dimensional predictive unit 5 and a zigzag scanner 7 respectively. The one-dimensional predictive unit 5 compresses an amount of data of the dc conversion coefficients 2a successively incoming from the linear quantizer 2 and supplies the compressed data to a first Huffman coder 6. The first Huffman coder 6 effects a Huffman coding and sends the result to a multiplexer 9.

The zigzag scanner 7 scans the ac conversion coefficient 2b zigzag from low to high spatial frequencies as shown in FIG. 6 and sends the result to a second Huffman coder 8. The second Huffman coder 8 produces Huffman codes from a run length of coefficients indicting "0" and from a coefficient of not "0" similarly and send them to a multiplexer 9. The multiplexer 9 multiplexes the output of the first Huffman coder 6 and the output of the second Huffman coder 8 to produce and send a multiplexed signal 9a to a transmission line (not shown). The multiplexed signal including the first and second Huffman codes is recorded on a magnetic tape (not shown).

The scaling factor S is provided for controlling an amount of codes included in the multiplexed signal 9a per one field to a constant; otherwise the amount of codes included in the multiplexed signal 9a will vary in accordance with input video data because a variable code length is used in the data compression mentioned above.

However, there is a problem that in the digital VTR effecting the video data compression in which video data within a block of pixels are extracted from one frame of the superimposed video data and data compression is effected at every block of pixels, the picture quality of an image around the character or mark is affected in accordance with a position or shape of a character.

More specifically, in the video band compression apparatus, one frame of a luminance signal is sampled at a matrix having 480 (vertical)×720 (horizontal) pixels. The sampled data are divided into blocks, each having 8×8 pixels, that is, into 60 (vertical)×90 (horizontal) blocks.

In such an image data compression apparatus using the DCT processing and in a general image data compression processing, a compression processing error (compression distortion) occurs at a steep edge or at a portion having a high frequency components. In this video data compression processing using the DCT, this compression processing error is referred to as "mosquito noise".

Generally, a character or a mark superimposed on an reproduced image in an analog or digital VTR has a size corresponding to 32 (vertical)×16 (horizontal) pixels in the case of the above-mentioned parameters. FIGS. 7A to 7C are schematic illustration for showing a superimposed character through a prior art superimposing processing. When a character "5" is superimposed at a given position with respect to the matrix of the blocks (32×16) as shown in FIG. 7A, each block having 8×8 pixels, there arises an occasion the character "5" is superimposed spreads over 15 blocks as shown in FIG. 7A. FIG. 7B is a partial illustrations of FIG. 7A. In FIG. 7B, there are edges having low vertical and horizontal correlation in the block, so that the mosquito noise occurs in the block. Moreover, there is a tendency that the noise occurring around the character is visually prominent.

SUMMARY OF THE INVENTION

The present invention has been developed in order to remove the above-described drawbacks inherent to the conventional method of superimposing data of a character or a mark on video data, the video data including the superimposed data being subjected to a data compression processing in which the video data including the superimposed data within a block of pixels.

According to the present invention there is provided a method of superimposing data of a character or a mark, such as @, and →, on video data, the superimposed video data being subjected to a data compression processing for extracting video data within each of blocks from one frame of the superimposed video data and for data-compressing the extracted video data, the blocks forming the one frame, each block including a predetermined number of two-dimensionally arranged pixels of the superimposed video data, comprising the step of: determining a position of the character or mark superimposed on the video data with respect to a lump of the blocks, where the character or mark is to be imposed, such that the number of blocks over which the character spread is minimized when a size and a shape of the character or the mark are unchanged.

According to the present invention there is also provided a method of superimposing data of a character or a mark on video data, the superimposed video data being subjected to a data compression processing for extracting video data within each of blocks from the one frame of the superimposed video data and for data-compressing the extracted video data, the blocks forming one frame, each block including a predetermined number of two-dimensionally arranged pixels of the superimposed video data, comprising the step of: arranging at least a portion of a body of the character at a middle portion of the block and arranging an outline of the character near or tangent to a boundary of the block.

According to the present invention there is further provided a method of superimposing data of a character or a mark on video data, the superimposed video data being subjected to a data compression processing for extracting video data within each of blocks from one frame of the superimposed video data and for data-compressing the extracted video data, the blocks forming the one frame, each block including a predetermined number of two-dimensionally arranged pixels of the superimposed video data, comprising the step of: determining a horizontal (vertical) size of the character or mark in accordance with a natural number times the number of horizontally (vertically) arranged pixels out of the two-dimensionally arranged pixels within the block.

BRIEF DESCRIPTION OF THE DRAWINGS

The object and features of the present invention will become more readily apparent from the following detailed description taken in conjunction with the accompanying drawings in which:

FIG. 2A shows a timing chart for showing waveforms at respective outputs of the switching control signal generation circuit shown in FIG. 1;

FIG. 2B shows a schematic illustration showing a picture image where superimposing is effected by the digital video tape recorder camera employing the method of this invention;

FIG. 6 is an illustration of a DCT coefficient block for showing the zigzag scanning operation carried out in the video data compression unit shown in FIG. 5; and FIGS. 7A to 7C are schematic illustrations for showing a superimposed character through a prior art superimposing processing.

The same or corresponding elements or parts are designated as like references throughout the drawings.

DETAILED DESCRIPTION OF THE INVENTION

Figure 1:
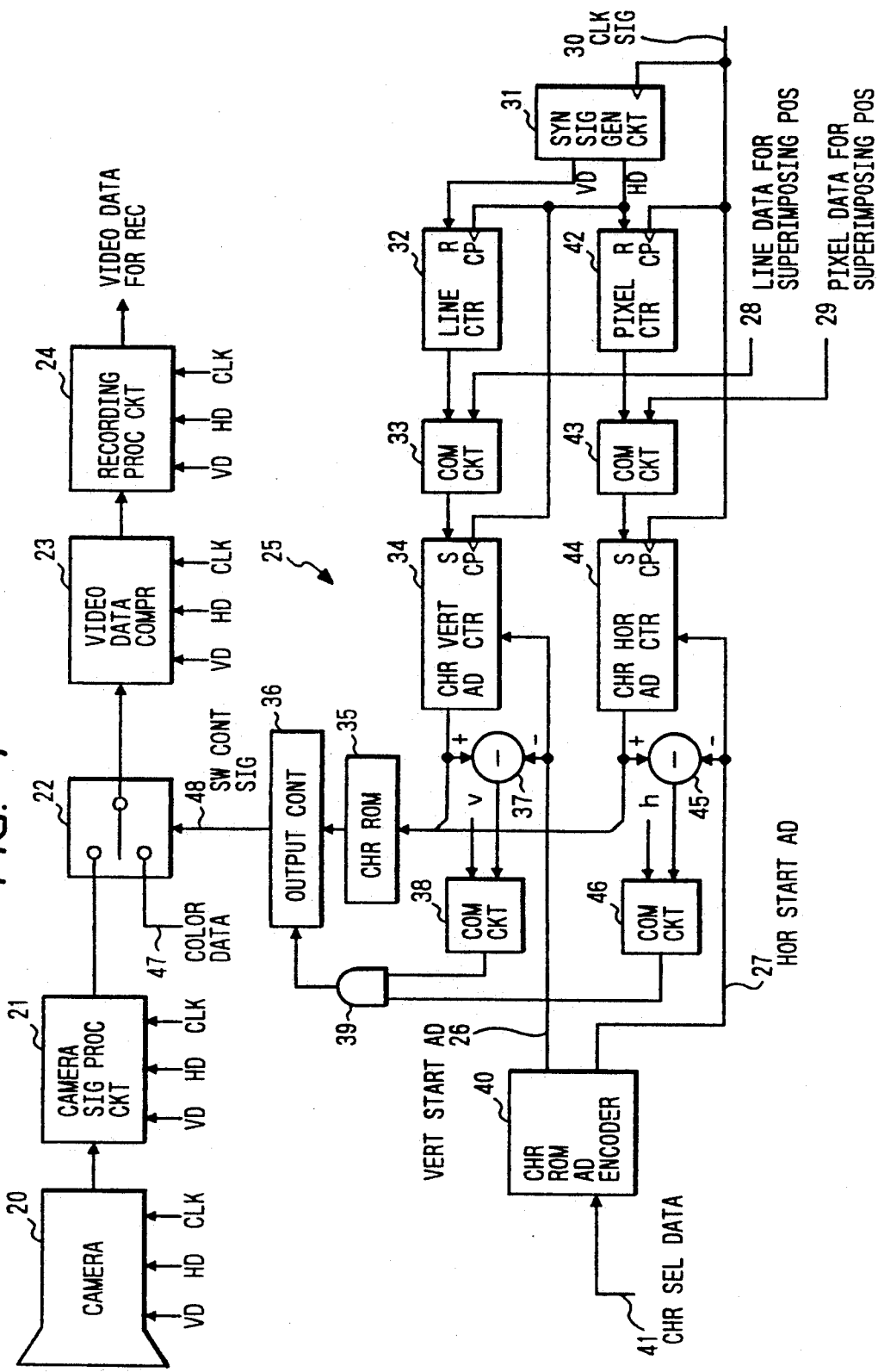
FIG. 1 is a block diagram of a digital video tape recorder camera employing the method of this invention.

Hereinbelow will be described an embodiment of this invention with reference to drawings. FIG. 1 is a block diagram of a digital VTR (video tape recorder) camera employing the method of this embodiment. This digital VTR camera comprises: a camera unit 20 including a lens unit, an imaging device, etc. for receiving an picture image and for converting the picture image into a video signal; a camera signal processing circuit 21 for processing the video signal wherein the analog video signal is converted into a digital video signal and the luminance signal is subjected to $\gamma$ characteristic compensation, white clip, and the like and the color signal is subjected to the $\gamma$ characteristic compensation and the like; a switch 22 for selecting either of outputs from the camera signal processing circuit 21 and a color data 47 for superimposing of a character in response to a switching control signal 48; an image data compression unit 23 for compressing digital video data from the switch 22; a recording processing circuit 24 for processing the digital video data and producing a video signal for recording. The video signal for recording is recorded on a magnetic tape (not shown) as similar to the conventional VTR.

The camera unit 20 receives an picture image by the imaging device through the lens unit and converts the picture image into a video signal. The camera signal processing circuit 21 processes the video signal. That is, the analog video signal is a/d converted to produce a digital video signal by an a/d converter (not shown). Moreover, the luminance signal of the video signal is subjected to the $\gamma$ characteristic compensation, white clip, and the other well-known processings. The color signal of the video signal is subjected to the $\gamma$ characteristic compensation also and the other well-known processing. The switch 22 selects either of outputs from the camera signal processing circuit 21 and the color data 47 for superimposing of a character in response to the switching control signal 48. The image data compression unit 23 compresses the digital video data from the switch 22 such that the image data compressor 23 extracts data at a block from one frame of video data, each block having 8×8 pixels and then it compresses the video data at every block. The video data compression unit 23 has the same structure and operation as the prior art video data compression unit 23. Therefore, a detailed description is omitted. The recording processing circuit 24 processes the digital video data and produces the video signal for recording. The camera unit 20, camera signal processing circuit 21, video data compression unit 23, and recording processing circuit 24 operate in response to a vertical drive signal VD, a horizontal drive signal HD, and a clock signal 30 (CLK).

The switch 22 continuously transfers the video signals from the camera signal processing circuit 21 to the image data compression unit 23 in a normal condition. In a superimposing mode the switch 22 switches a source of data sent to the image data compression unit 23 from the camera circuit 21 to the color data 47 intermittently in response to the switching control signal 48 to superimposes a desired character on a reproduced video image. The switching control signal is produced by a switching control signal producing circuit 25. The switching control signal producing circuit 25 comprises: a synchronizing signal generation circuit 31 for generating a vertical drive signal VD and a horizontal signal HD in response to a clock signal (pulse) 30; a line counter 32 for counting pulses of the horizontal drive signal VD from the reception of the vertical drive signal VD to provide a count of horizontal lines within a frame; a comparing circuit 33 for comparing the count of horizontal lines with line data 28 indicative of a desired superimposing position; a character vertical address counter 34 for counting horizontal lines for determining an address of a character ROM 35 for reading; a character ROM address encoder 40 for determining a vertical start address indicative of a desired character in accordance with data of a character selection data 41, the vertical start address of the desired character being set to the character vertical address counter 34 in response to an output of the comparing circuit 33; a subtractor 37 for subtracting the vertical start address 26 from the count value of the horizontal line from the character vertical address counter 34 to provide the number of horizontal lines from the start line for superimposing to the present line; a comparing circuit 38 for comparing the number of the horizontal line from the start line with a predetermined value v for providing a vertical end point of superimposing; a pixel counter 42 for counting pulses of the clock signal 30 from the reception of the horizontal drive signal HD to provide a count of horizontal position within a frame; a comparing circuit 43 for comparing the count of clock pulses 30 with pixel data 29 indicative of a desired superimposing horizontal position; a character horizontal address counter 44 for counting clock pulses 30 for determining an address of the character ROM 35 for reading, the character ROM address encoder 40 also determining a horizontal start address indicative of a desired character in accordance with data of a character selection data 41, the horizontal start address of the desired character being set to the character horizontal address counter 44 in response to an output of the comparing circuit 43; a subtractor 45 for subtracting the horizontal start address 27 from the count value of the clock pulse (signal) 30 outputted from the character horizontal address counter 44 to provide the number of clock pulses (pixels) from the start position for superimposing to the present horizontal position; a comparing circuit 46 for comparing the number of the clock pulses 30 from the start position with a predetermined value h for providing a horizontal end point of superimposing; an AND gate 39 for providing an output control signal indicative of output timings for superimposing when both vertical and horizontal positions lies within the superimposing region; and an output control circuit 36 for producing the switching control signal 48 when the vertical and horizontal scanning positions lies within the superimposing region and the character ROM indicates the present position lies in a body of the character.

FIG. 2A shows a timing chart for showing waveforms at respective outputs of the switching control signal generation circuit 25 of this embodiment. FIG. 2B shows a schematic illustration showing a picture image where superimposing is effected by the digital video tape recorder camera employing the method of this embodiment.

The synchronizing signal generation circuit 31 generates the vertical drive signal VD and the horizontal signal HD by counting the clock signal (pulse) 30. The line counter 32 counts pulses of the horizontal drive signal HD from the reception of the vertical drive signal VD to provide the count of horizontal lines within a frame. That is, the line counter 32 is reset by the vertical drive signal VD and counts the horizontal drive signal (pulse) HD. Waveform 50 shows the vertical drive signal HD; waveform 51 shows the horizontal drive signal HD; and waveform 52 shows an output of the line counter 32. The comparing circuit 33 compares the count of horizontal lines within a frame with line data 28 for providing a vertical start timing of the desired superimposing position of a character. The character vertical address counter 34 counts horizontal lines to determine an address of a character ROM 35 together with the character horizontal address counter 44 for reading and this provides a present vertical scanning position within a superimposing region. The character ROM address encoder 40 determines a vertical start address indicative of the desired character in accordance with data of the character selection data 41. The character selection data 41 is produced by a control circuit (not shown) in response to a clock (not shown) or other desired data (not shown). The vertical start address of the desired character is set to the character vertical address counter 34 in response to the output of the comparing circuit 33. The subtractor 37 subtracts the vertical start address 26 from the count value of the horizontal line from the character vertical address counter 34 to provide the present vertical position from the start line for superimposing. The comparing circuit 38 compares the present vertical position from the start line with the vertical gate width v to provide the vertical end point of superimposing. That is, the comparing circuit 38 produces a superimposing vertical gate as shown by waveform 54. That is, the comparing circuit 38 outputs a logic high while the difference between the present vertical position and the vertical start address 26 is a value of form zero to v.

The pixel counter 42 counts pulses of the clock signal 30 from the reception of the horizontal drive signal HD to provide a count of horizontal position of pixels from the left end of the frame. The comparing circuit 43 compares the count of clock pulses 30 with pixel data 29 indicative of a desired superimposing horizontal position. The character horizontal address counter 44 counts clock signal (pulse) 30 to determine the address of the character ROM 35 for reading together with the character vertical address counter 34. The character ROM address encoder 40 also determines a horizontal start address indicative of a desired character stored in the character ROM 35 in accordance with data of a character selection data 41. The horizontal start address of the desired character is set to the character horizontal address counter 44 in response to the output of the comparing circuit 43. The subtractor 45 subtracts the horizontal start address 27 from the count value of the clock pulse (signal) 30 outputted from the character horizontal address counter 44 to provide the horizontal present position from the start position for superimposing. The comparing circuit 46 compares the horizontal present position with the horizontal gate width h to provide the horizontal end point of superimposing. Waveform 59 shows the superimposing horizontal gate. That is, the comparing circuit 48 outputs a logic high while the difference between the present horizontal position and the horizontal start address 27 is a value of from zero to h.

The AND gate 39 provides the output control signal indicative of output timings when both vertical and horizontal positions lies within the superimposing region. The output control circuit 36 produces the switching control signal 48 when the vertical and horizontal scanning positions lies within the superimposing region and the character ROM indicates the present position lies in a body of the character. That is, the AND gate provides timing of the superimposing region and the character ROM provides timings of drawing the body of the desired character. The color of the desired character is determined by the color data 47.

Figure 5:
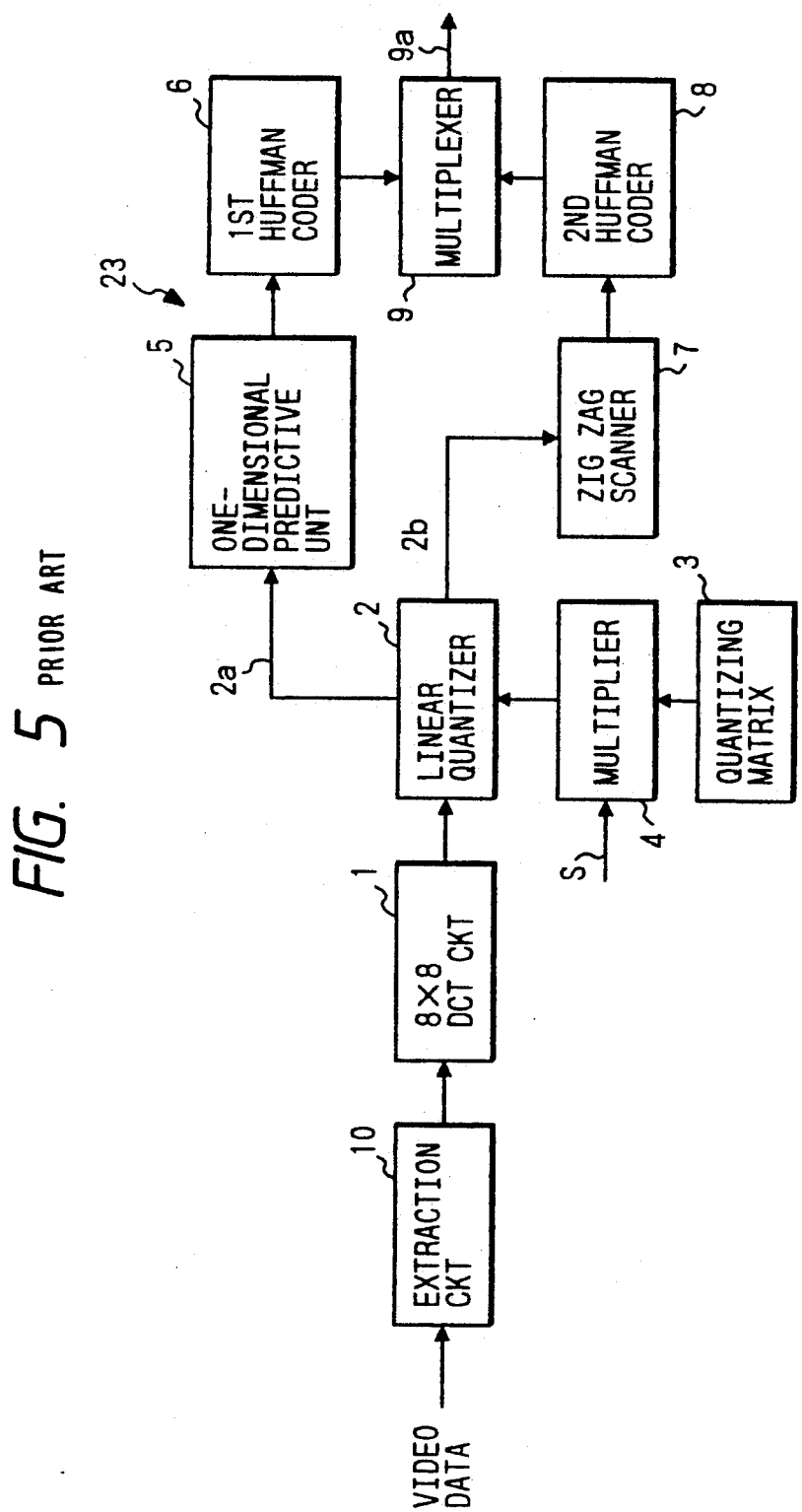
FIG. 5 is a block diagram of an example of a video data compression unit of this invention for effecting a video data compression processing.

FIG. 5 is a block diagram of an example of a video data compression unit 23 of this embodiment for effecting a video data compression processing. FIG. 6 is an illustration of a DCT coefficient block for showing the zigzag scanning operation carried out in the video data compression unit shown in FIG. 2). FIGS. 5 and 6 are used in the description of the prior art also.

An extraction circuit 10 consecutively extracts data of a DCT (Discrete cosine Transform) block (matrix) including 8×8 pixels from one frame of video data from the switch 22. The extracted data is supplied to a DCT circuit 1 (8×8 DCT). The DCT circuit I supplies 8×8 conversion coefficients obtained by the two-dimensional discrete cosine transforming to a linear quantizer 2. The linear quantizer 2 effects the linear quantizing with a quantizing matrix obtained by multiplying a reference quantizing matrix supplied from a quantizing matrix generator 3 (quantizing matrix) by a scaling factor S with a multiplier 4 to provide a dc conversion coefficient 2a and ac conversion coefficients 2b which are supplied to a one-dimensional predictive unit 5 and a zigzag scanner 7 respectively. The one-dimensional predictive unit 5 compresses an amount of data of the dc conversion coefficients 2a successively incoming from the linear quantizer 2 and supplies the compressed data to a first Huffman coder 6. The first Huffman coder 6 effects a Huffman coding and sends the result to a multiplexer 9.

The zigzag scanner 7 scans the ac conversion coefficients 2b zigzag from low to high spatial frequencies as shown in FIG. 6 and sends the result to a second Huffman coder 8. The second Huffman coder 8 produces Huffman codes from a run length of coefficients indicating "0" and from a coefficient of not "0" similarly and send them to a multiplexer 9. The multiplexer 9 multiplexes the output of the first Huffman coder 6 and the output of the second Huffman coder 8 to produces and send a multiplexed signal 9a to a transmission line (not shown). The multiplexed signal including the first and second Huffman codes is sent to the recording processing circuit 24 and an output of the recording processing circuit 24 is recorded on a magnetic tape (not shown).

The scaling factor S is provided for controlling an amount of codes included in the multiplexed signal 9a per one field to a constant; otherwise the amount of codes included in the multiplexed signal 9a will vary in accordance with input video data because a variable code length is used in the data compression as mentioned above.

Hereinbelow will be described a method of preparing data of characters stored in the character ROM 35.

Figure 3A:
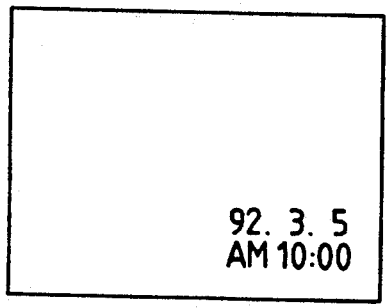
FIGS. 3A and 3B are illustrations for showing examples of superimposing of characters on a display of this invention.
Figure 3B:
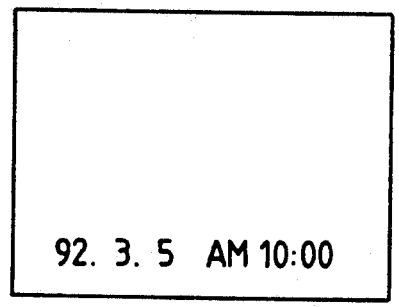

FIGS. 3A and 3B are illustrations for showing examples of superimposing of characters on a display of this embodiment. The position of superimposing is determined by the line data 28 and pixel data 29 and the superimposed character is determined by the character selection data 41. In FIG. 3A and 3B, the character selection data 41 is produced in accordance with a clock (not shown) to indicate date and time.

Hereinbelow will be described the method of superimposing data of a character or a mark, such as @, and →, on video data of this embodiment.

The position of superimposing a character or a mark on the video signal with respect to the position of the block (matrix) of pixels for video data compression determines the picture quality around the character. Moreover, the position and shape of the character stored in the character ROM also affects the picture quality around the character.

FIGS. 4A to 4D are illustrations for showing positions and shapes of characters prepared by the method of this embodiment. In FIGS. 4A to 4D, each small square is block (matrix) 67 of pixels (8×8), and outermost lines 62 of each drawing in which 5×3 blocks are included are boundaries for one character.

In this specification, edges of a character are referred to as a character outline 61; a smallest common rectangular 63 means an imaginary rectangular which is the smallest rectangular, but larger than the outline of the character. In fact, the smallest common rectangular means horizontal most outer lines and vertical most outer rows of pixels of plurality of blocks for displaying the character.

Position of a character to be superimposed will be described.

The line data 28 and 29 for superimposing position are determined such that a body of a character is substantially tangent to sides of blocks 67 (outer line and row of pixels within a block) and the number of blocks over which the body of the character spreads is minimized when the size of the character unchanged. Therefore, noise occurring around the character outline 61 is inconspicuous. That is, a position of respective portions of a character must be positioned as near to sides of blocks as possible.

Figure 4A:
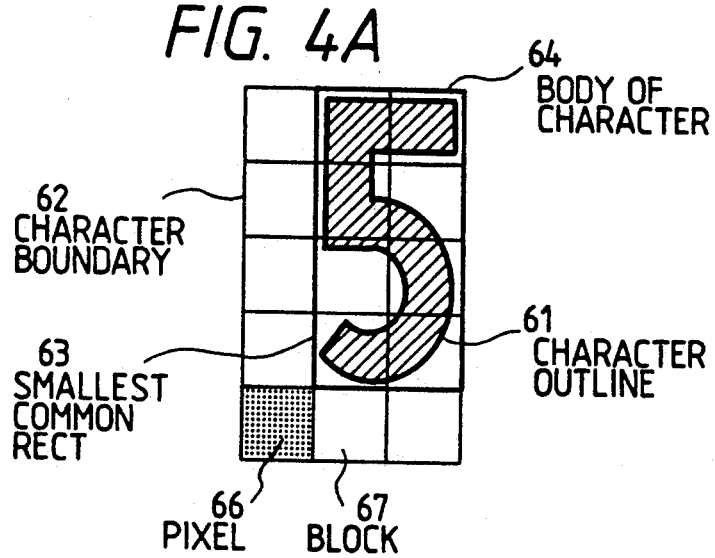
FIGS. 4A to 4D are illustrations for showing positions and shapes of character "5" prepared by the method of this invention.

Comparing FIG. 4A with FIG. 7A, the size of the character "5" is the same but the character "5" in FIG. 7A spreads over fifteen blocks. On the other hand, the "5" shown in FIG. 4A spreads over only eight blocks. That is, the position of the character is determined such that the number of blocks over which the body 64 of the character spreads is minimized when the size of the character unchanged or such that number of sides of blocks over which the body 64 of a character crosses is minimized.

Shape of a character to be superimposed will be described.

Figure 4B:
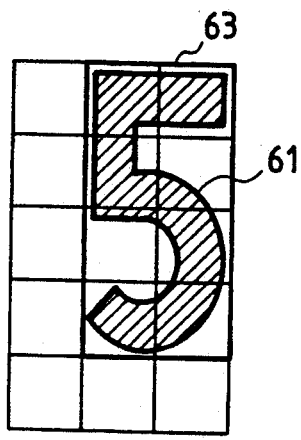
Figure 4C:
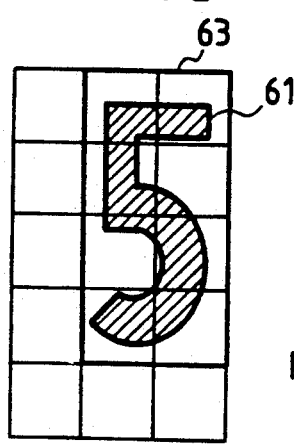

The character "5" shown in FIG. 7C is relatively large and spreads over fifteen blocks 67. Therefore, the number of places where noise occurs is large. Therefore, the character "5" shown in FIG. 7C is undesirable. In contrast to this, the character "5" shown in FIG. 4B is relatively small and spreads over a fewer blocks 67. Moreover, a large number of portions of character outline are substantially tangent or close to the sides of blocks 67, so that noise occurring around the character outline 61 is inconspicuous. In other words, the body of a character should occupy the middle of the block 67 and spread near the sides of block 67. Character "5" shown in FIG. 4C is considerably smaller than the smallest common rectangular 63, so that noise character occurring around the character outline 61 is more conspicuous than the character "5" shown in FIG. 4B. Therefore, the character "5" shown in FIG. 4B is most desirable in conspicuousness of noise.

Experiment shows that arranging the outline of a character apart from the boundary of blocks 67 within about three pixels has an effect for reducing the conspicuousness of noise.

Therefore, the VTR camera apparatus of this embodiment, characters stored in the character ROM are prepared such that the outline of each character is arranged as close to block boundaries (sides) as possible.

That is, if (a×b) pixels within a block 67 is extracted for video data compression, the size of a character, that is, the smallest common rectangular 63 is set to have a vertical length of a first natural number times "a" and a horizontal length of a second natural number times "b" wherein "a" and "b" are also natural numbers. In fact, the actual size of the character or mark is determined by the interval of pixels also. Then, the shape of the outline of the character is set to be substantially tangent or close to the bock boundaries or the smallest common rectangular 63.

Figure 4D:
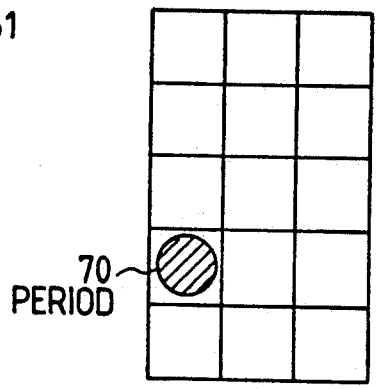

In this embodiment, 8×8 pixels as a block are extracted for image data compression. The size of a character having 32 (vertical)×16 (horizontal) pixels is suitable in consideration of other currently used VTR camera. Therefore, the size of characters stored in the character ROM 35 has these dimensions. Moreover, characters (mark) occupying a small area, such as colon, period, and the like are stored such that an outline of each character is arranged within a block 67 without spreading over a plurality of blocks 67 as shown in FIG. 4D.

Therefore, according to this embodiment, noise occurring around an outline of a character superimposed on a video data signal which is subjected to video data compression every block having a plurality of pixels arranged in a matrix is reduced by positioning the character to be superimposed with respect to the blocks such that the number of blocks over which the character spreads is minimized and by preparing and storing the character in the ROM 35 such that its outline is set to be substantially tangent or close to the block boundary or the smallest common rectangular 63.

This method is commonly applicable to the NTSC system employing 525 scanning lines and to the PAL system employing 625 scanning lines.

In this embodiment, the block coding is carried out through the DCT processing. However, this method is naturally applicable to other system employing block coding through a processing other than the DCT processing.

Moreover, in this embodiment the method of superimposing data of a character or a mark on video data is carried out in the VTR camera. However, this method is naturally applicable to other apparatus, such as a video disc reproducing apparatus or other apparatus using other recording mediums, employing block coding.

Moreover, in the method of superimposing data, there are there basic methods. That is, the position of the character or mark superimposed on the video data is determined; at least a portion of a body of the character or mark is arranged at a middle portion of the block and an outline of the character is arranged near or tangent to a boundary of the block; the horizontal or vertical size of the character or mark is determined in accordance with a natural number times the number of horizontally or vertically arranged pixels out of the two-dimensionally arranged pixels within the block. However, these methods can be performed in combination with each other and orders between them can be changed.

What is claimed is:

1. A method of superimposing data of a character or a mark on video data, said superimposed video data being subjected to a data compression processing for extracting video data within each of blocks from one frame of said superimposed video data and for data-compressing said extracted video data, said blocks forming said one frame, said each block including a predetermined number of two-dimensionally arranged pixels of said superimposed video data, comprising the step of:

determining a position of said character or mark superimposed on said video data with respect to a lump of said blocks, where said character or mark is to be imposed, such that the number of blocks over which said character spreads is minimized when a size and a shape of said character or said mark are unchanged.

2. A method as claimed in claim 1, further comprising the step of: arranging at least a portion of a body of said character or mark at a middle portion of said block and arranging an outline of said character near or tangent to a boundary of said block.

3. A method as claimed in claim 1, further comprising the step of: determining a horizontal size of said character or mark in accordance with a natural number times the number of horizontally arranged pixels out of said two-dimensionally arranged pixels within said block.

4. A method as claimed in claim 1, further comprising the step of: determining a vertical size of said character or mark in accordance with a natural number times the number of vertically arranged pixels out of said two-dimensionally arranged pixels within said block.

5. A method of superimposing data of a character or a mark on video data, said superimposed video data being subjected to a data compression processing for extracting video data within each of blocks from one frame of said superimposed video data and for data-compressing said extracted video data, said blocks forming said one frame, said each block including a predetermined number of two-dimensionally arranged pixels of said superimposed video data, comprising the step of:

arranging at least a portion of a body of said character at a middle portion of said block and arranging an outline of said character near or tangent to a boundary of said block.

6. A method as claimed in claim 5, further comprising the step of: determining a position of said character or mark superimposed on said video data with respect to a lump of said blocks, where said character or mark is to be imposed, such that the number of blocks over which said character spreads is minimized when a size and a shape of said character are unchanged.

7. A method as claimed in claim 5, further comprising the step of: determining a horizontal size of said character or mark in accordance with a natural number times the number of horizontally arranged pixels out of said two-dimensionally arranged pixels within said block.

8. A method as claimed in claim 5, further comprising the step of: determining a vertical size of said character or mark in accordance with a natural number times the number of vertically arranged pixels out of said two-dimensionally arranged pixels within said block.

9. A method of superimposing data of a character or a mark on video data, said superimposed video data being subjected to a data compression processing for extracting video data within each of blocks from one frame of said superimposed video data and for data-compressing said extracted video data, said blocks forming said one frame, said each block including a predetermined number of two-dimensionally arranged pixels of said superimposed video data, comprising the step of:

determining a horizontal size of said character or mark in accordance with a natural number times the number of horizontally arranged pixels out of said two-dimensionally arranged pixels within said block.

10. A method as claimed in claim 9, further comprising the step of: arranging at least a portion of a body of said character or mark at a middle portion of said block and arranging an outline of said character near or tangent to a boundary of said block.

11. A method as claimed in claim 9, further comprising the step of: determining a position of said character or mark superimposed on said video data with respect to a lump of said blocks, where said character or mark is to be imposed, such that the number of blocks over which said character spreads is minimized when a size and a shape of said character or said mark are unchanged.

12. A method of superimposing data of a character or a mark on video data, said superimposed video data being subjected to a data compression processing for extracting video data within each of blocks from one frame of said superimposed video data and for data-compressing said extracted video data, said blocks forming said one frame, said each block including a predetermined number of two-dimensionally arranged pixels of said superimposed video data, comprising the step of:
determining a vertical size of said character or mark in accordance with a natural number times the number of vertically arranged pixels out of said two-dimensionally arranged pixels within said block.

13. A method as claimed in claim 12, further comprising the step of: determining a position of said character or mark superimposed on said video data with respect to a lump of said blocks, where said character or mark is to be imposed, such that the number of blocks over which said character spreads is minimized when a size and a shape of said character or said mark are unchanged.

14. A method as claimed in claim 12, further comprising the step of: arranging at least a portion of a body of said character at a middle portion of said block and arranging an outline of said character near or tangent to a boundary of said block.

15. A method of superimposing data of a character or a mark on video data, said superimposed video data being subjected to a data compression processing for extracting video data within each of blocks from one frame of said superimposed video data and for data-compressing said extracted video data, said blocks forming said one frame, said each block including a predetermined number of two-dimensionally arranged pixels of said superimposed video data, comprising the step of:
determining a position of said character or mark superimposed on said video data with respect to a lump of said blocks, where said character or mark is to be imposed, such that the number of blocks over which said character spread is minimized when a size and a shape of said character or said mark are unchanged;
arranging at least a portion of a body of said character or mark at a middle portion of said block and arranging an outline of said character near or tangent to a boundary of said block;
determining a horizontal size of said character or mark in accordance with a first natural number times the number of horizontally arranged pixels out of said two-dimensionally arranged pixels within said block;
determining a vertical size of said character or mark in accordance with a second natural number times the number of vertically arranged pixels out of said two-dimensionally arranged pixels within said block.

* * * * *